May 21, 1929.  O. A. FREDERICKSON  1,713,526
ELECTRICAL CIRCUIT FITTING
Filed May 27, 1926
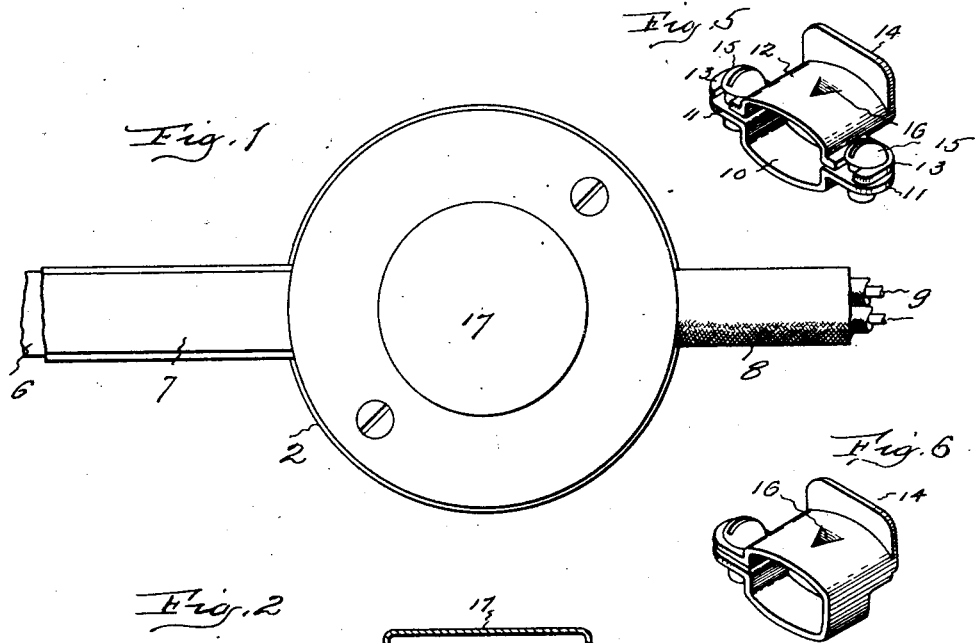
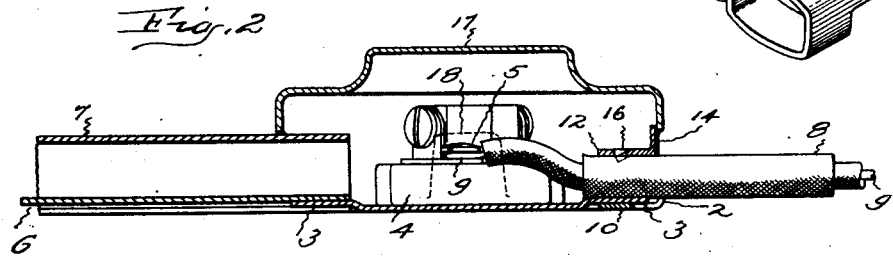
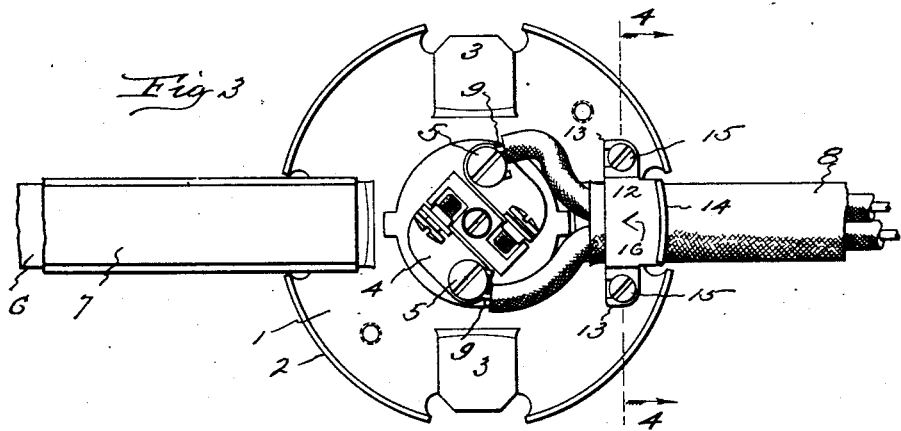
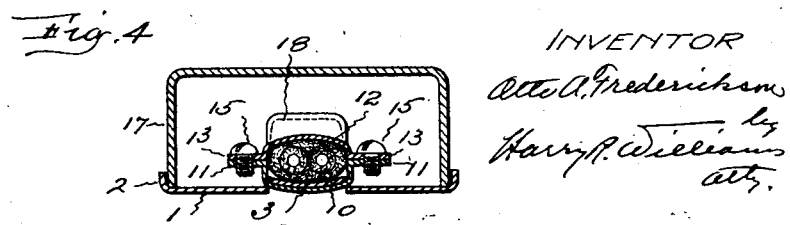

Patented May 21, 1929.

1,713,526

UNITED STATES PATENT OFFICE.

OTTO A. FREDERICKSON, OF WETHERSFIELD, CONNECTICUT, ASSIGNOR TO THE AMERICAN WIREMOLD CO., OF HARTFORD, CONNECTICUT, A CORPORATION OF CONNECTICUT.

ELECTRICAL-CIRCUIT FITTING.

Application filed May 27, 1926. Serial No. 111,970.

This invention relates to those fittings which are used in connection with surface wiring. Circuit wires run on the surface have been concealed in conduits or metal moldings that have been connected with junction boxes, branch boxes, switch boxes, fixture boxes and lamp socket boxes and the like conduit fittings containing a compartment for wire connections. It is sometimes desirable and necessary to connect non-metallic sheathed cables containing one, two or three wires to such conduit fittings.

The object of this invention is to provide simple, cheap and easily manipulated means whereby non-metallic sheathed cables can be quickly, securely and neatly connected to conduit fittings of the class mentioned and thus at but slightly additional expense permit the ready connection of non-metallic sheathed cables with metal mold fittings.

Metal mold fittings commonly have bases designed to be attached to a wall or ceiling and covers removably fastened to the bases. Secured to these bases and enclosed by the covers there may be, but not always, insulated junction blocks, branch blocks, switch blocks, extension blocks or lamp socket blocks provided with binding screws for the connection of the terminal wires of the installation with which they are used. Some types of the covers of these fittings have twist-outs which can be removed as necessary for the entrance of the moldings, and the bases have radially extending tongues for engaging and holding the ends of the metal moldings.

The object of this invention is attained by providing an adapter designed to be clamped on a non-metallic sheathed cable near the end that is unsheathed and the wires separated and bared for connection with the binding screws in the fitting, which adapter not only prevents further unsheathing, separation and baring of the wires, but is so constructed and connected with the base and located within the cover that it closes the opening through which the cable enters and cannot be pulled out of the fitting, or the cable drawn through it.

In the accompanying drawings Fig. 1 shows a plan of a fitting with a section of metal mold entering at one side and a non-metallic sheathed cable entering at the other side. Fig. 2 is a longitudinal section of the same. Fig. 3 is a plan with the cover removed. Fig. 4 is a section on the plane indicated by the dotted line 4—4 on Fig. 3. Fig. 5 is a perspective view of a two piece adapter. Fig. 6 is a view of a one piece adapter.

The base 1 of the fitting illustrated is stamped to shape from thin metal. The base shown is circular, but it may have any other desired outline. This base has an upturned rim 2 and radially extending tongues 3 the number of which tongues may be varied according to the installation with which the fitting is to be used. These tongues are raised slightly above the plane of the base. Fastened to the base is an insulating connecting block 4 having binding screws 5.

The wire mold shown has a base strip 6 and a cap 7 the edges of which cap are sprung over the edges of the base strip. In connecting this type of conduit with the fitting, the fitting base tongue 3 is inserted below the conduit base strip 6 and between the edges of the cap 7, the friction of the base strip and the grip of the edges of the cap on the tongue holding the parts firmly together. One or more conduits may be attached to the base of the fitting in such localities as is necessary to conform to the wiring installation.

To connect a non-metallic sheathed cable with such a fitting, the sheathing 8 is removed for a short distance and the ends of the wires 9 bared, so that the wires may be separated and fastened, and the adapter applied at the end of the sheathing.

The adapter first shown is a divided loop comprising a lower yoke-shaped member 10 with projecting ears 11, and an upper yoke-shaped member 12 with projecting ears 13, the latter member also having an upwardly extending lip 14. In connecting these elements to a fitting the lower member of the loop is passed under a tongue of the base and the upper section is placed over the sheathed cable and drawn down by screws 15 which pass through the ears of the upper member and are threaded through the ears in the lower member. A tooth 16 is preferably struck in from the upper member of the adapter in such manner that it will engage the sheathing and provide an additional means for preventing the cable from being pulled from the adapter. The adapter may be in one piece, as shown in Fig. 6. This adapter is open on one side to allow it to slip on the cable and under the tongue This form requires fastening means on one side only.

The cover 17 of the fitting illustrated has twistouts 18 arranged at different localities in its rim which may be removed as required to permit the insertion of the end of a metal mold or the end of a non-metallic sheathed cable.

When a non-metallic sheathed cable is connected in the manner above set forth the end of the sheathing is so tightly grasped and clamped to the tongue of the fitting base, and the tooth so embedded in the sheathing that the cable can not be pulled from the adapter, and when the cover is placed upon the base the lip on the upper member of the adapter not only closes the opening in the cover provided for the entrance of the cable but so engages the inner wall of the cover that the adapter cannot be drawn from the tongue and the wires pulled from the binding screws, thus always ensuring electrical continuity.

This simple adapter which can be used to clamp cables of different outlines and thickness, containing one, two or three wires, as the case may be, not only anchors the cable and prevents any possible disconnecting of the wires, but also binds the end of the cable in such manner that the cable sheathing will not become further opened or frayed and the wires exposed to the edges of the metallic base or cover. The provision of this cheap adapter obviates the necessity of the manufacturer making, the dealer keeping in stock, and the installer carrying to place of use two types of fittings, one for metal mold and another for connecting non-metallic sheathed cables, as with this adapter the structure described can be used to connect metal moldings, non-metallic sheathed cables, or both as occasion arises.

The invention claimed is:

The combination of an electrical fitting comprising a base having a tongue, a cover removably applied to the base and enclosing a compartment for wire connections, said cover having an opening adjacent to the tongue on the base, of a sectional loop having sidewise extending perforated ears, said loop being located entirely within said cover and comprising a lower yoke shaped member adapted to engage beneath the base tongue and an upper yoke shaped member adapted to grasp a cable above the base tongue, said upper member having an upwardly bent lip that fits flatwise against the inside wall of the cover so as to close the opening in the cover not occupied by the cable and also prevent the outward movement of the loop, and screws securing the ears of said loop members together with the cable and tongue between them.

OTTO A. FREDERICKSON.